United States Patent [19]

Sauvestre

[11] Patent Number: 4,766,812

[45] Date of Patent: Aug. 30, 1988

[54] VARNISH PROTECTING A CASELESS OR COMBUSTIBLE-CASE ROUND OF AMMUNITION AGAINST THERMOINITIATION

[75] Inventor: Gerard D. Sauvestre, Bourges, France

[73] Assignee: Etat Francais represente par le Delegue Ministeriel pour l'Armement, Paris, France

[21] Appl. No.: 929,843

[22] Filed: Nov. 13, 1986

[51] Int. Cl.$^4$ ............................................. F42B 5/18
[52] U.S. Cl. ................................................ 102/290
[58] Field of Search ................................. 102/290, 431

[56] References Cited

U.S. PATENT DOCUMENTS

| | | | |
|---|---|---|---|
| 3,877,374 | 4/1975 | Cook | 102/431 |
| 3,927,616 | 12/1975 | Axelrod et al. | 102/431 |
| 4,091,729 | 5/1978 | Bell et al. | 102/431 |
| 4,187,781 | 2/1980 | Flanagan et al. | 102/431 |
| 4,239,073 | 12/1980 | Reed et al. | 149/19.91 |
| 4,363,273 | 12/1982 | Luebben et al. | 102/290 |
| 4,365,558 | 12/1982 | Leppler et al. | 102/290 |
| 4,530,728 | 7/1985 | Sayles | 102/290 |

*Primary Examiner*—Edward A. Miller
*Attorney, Agent, or Firm*—Parkhurst & Oliff

[57] ABSTRACT

The invention concerns a protective varnish applied to a caseless or combustible-case round of ammunition against thermoinitiation. This varnish includes at least one reactive layer applied to the ammunition, consisting of a synthetic resin and an oxidizer with a decomposition temperature above 350° C., and at least one insulating layer applied to the reactive layer consisting of a synthetic resin and a heat insulating compound. The resins are of the polyurethane, alkyd or oleophenolic type and the oxidizer is selected from the group constituted by potassium perchlorate, lead or barium chromate according to a percentage by mass varying from 1 to 20%. The insulating compound is represented by organic or mineral microballoons. The varnish may include an inner resin layer interposed between the ammunition and the reactive layer, an an outer resin layer applied to the insulating layer. Application to the rounds of ammunition of any caliber.

14 Claims, No Drawings

VARNISH PROTECTING A CASELESS OR COMBUSTIBLE-CASE ROUND OF AMMUNITION AGAINST THERMOINITIATION

The technical sector of the present invention is the sector of varnishes protecting against thermo-initiation or every other thermal aggression.

The caseless or combustible-case rounds of ammunitions must be protected against the thermo-initiation which results from the high temperatures attained in the weapon. Without protection, and at relatively low temperatures of 350° to 400° C., the propellant grains of the ammunition may thus take fire spontaneously as soon as they are introduced into the weapon, which may cause very serious accidents.

The two great principles used in terms of thermal protection aim:

either at creating an insulating shield through the introduction of expanded materials (glass microballoons or microspheres), or at creating a heat-conducting shield produced by metal powders (copper, aluminium).

Therefore, the FR-A-2 294 421 patent describes the achievement of a combustible case made of polyurethane foam, charged with explosive or oxidizing mineral agents. The preparation process is expensive because of its complicated technology. Besides, it results most often in nonburnt combustion residues owing principally to the minimum thickness (1 to 2 mm) compatible with the manufacturing process. As a matter of fact, it uses an envelope, not a varnish.

The FR-A-2 444 251 patent deals with a protective varnish consisting of a resin loaded with phenolic microballs some tens of mm in thickness. In that case, the varnish is non-combustible and inevitably produces non-burnt combustion residues as soon as it appears necessary to increase the thickness of the layer, as it is the case with a protection against the high temperatures above 500° C. obtained in medium and small-caliber weapons.

We also known an agglomerated alveolate material according to the FR-A-2 508 896 patent consisting of a mineral oxidizer, an explosive, phenolic microballoons and a hardenable binder. By reason of its design, this product is prepared by moulding and extrusion. Consequently, it is mainly used to produce combustible objects such as rigid cases and containers.

Coating with one or more thin and homogeneous layers of this material cannot be envisaged because of the low binder percentage indicated (below 40%). Moreover, the necessary presence of explosives presents two disadvantages which are: an increased sensitivity and a low decomposition temperature. Therefore, this material cannot be applied to the ammunition as a protective varnish.

The aim of the invention is to propose a new protective varnish providing thermal protection at a temperature of up to 750° C. while being fully combustible.

The subject matter of the invention is thus a varnish protecting a caseless or a combustible case round of ammunition against thermoinitiation, characterized by the fact that it includes at least one reactive layer applied to the ammunition including a synthetic resin and an oxidizer the decomposition temperature of which is above 350° C. and at least one insulating layer applied to the reactive layer including a synthetic resin and a heat-insulating compound.

The resins used may be of the polyurethane, alkyd or oleophenolic type.

The oxidizer may be selected from the group which includes potassium perchlorate, lead or barium chromate at the rate of 1 to 20% by mass of the whole layer composition.

The insulating compound may consist of organic or mineral microballoons.

The varnish may include an inner resin layer interposed between the ammunition and the reactive layer, and an outer resin layer applied to the insulating layer.

The inner resin layer may be of the oleophenolic type, the reactive layer a polyurethane resin loaded at 10% by mass with potassium perchlorate, the insulating layer a polyurethane resin loaded with phenolic microballoons, and the outer layer a polyurethane layer.

The varnish may include two insulating layers.

The overall thickness of the coating may vary from 0.15 to 0.25 mm.

One of the results of the present invention is the fact that the varnish provides thermal protection to the propellant charge on which it is laid while leaving no solid combustion residues in the weapon.

Another result is the fact that this varnish is applied to the ammunition as a thin layer, which has little effect on the internal ballistic of the grain compared with a bare grain.

Each layer, applied to the propellant charge, has a very specific role and the order of application must be observed. Two layers may be used as a minimum. The order in which these layers are to be applied must be strictly observed. At the location which is the closest to the heat source, for instance in the weapon chamber, we find the insulating layer acting as a main thermal screen. This layer is made of a thermostable resin loaded with an insulating material such as phenolic microballoons.

The inner reactive layer is intended to eliminate the residues that may be generated by the insulating layer and is applied to the charge. So, the resin is loaded with oxidizing products which contribute to improving the varnish combustibility. The decomposition temperatures of these materials must be very high for the thermal resistance of the whole not be reduced.

Such products as potassium perchlorate (decomposition temperature=630° C.) and lead chromate (decomposition temperature=1200° C.) are perfectly suitable for that purpose.

Of course, these two layers must be used in combination with layers made of resin only. So, a first resin layer or inner layer may be applied to the charge and/or an outer layer to the insulating layer.

This first layer is a priming coat and is intended to eliminate the surface irregularities and improve the reactive layer adherence. Of course, it is very important to ascertain that the chemical nature of the resin utilized is compatible with that of the ammunition propellant charge. In particular, we must avoid the presence of chemical reactions which, in spite of the fact that they improve the layer adherence, result most often in an increased percentage of impurities or non-burnt residues. It was observed that an oleophenolic resin meets perfectly these requirements when used with a nitrocellulose-base charge.

The outer layer is a finishing coat applied to the insulating layer which also eliminates every irregularity which generates hot points. A polyurethane resin meets this requirement perfectly.

The resins utilized for the insulating and reacting layers and the outer layer are preferably those which have a good thermal stability. They must also have a low viscosity compatible with the load proportions utilized, usually 1 to 20% by mass, so as to obtain thin and homogeneous layers, because the proportion of residues increases usually with the varnish thickness. An overall thickness of 0.2 mm gives good results, as the thickness of each layer then varies from 0.02 to 0.08 mm.

Of course, the resins used for the various layers may be identical or different and each layer may consist of several sub-layers.

The compounds used in the invention are commercial compounds, but their purity must preferably be the best possible. The average grain size distribution in the oxidizer and in the heat insulating compound may advantageously be on the order of 50 to 80 μm.

The invention is illustrated by the following examples:

For each composition tested, the thermal stability on a hot plate was evaluated. The test consists in determining the reaction time required for a pyrotechnical event (smoke, flame, . . . ) to appear, when a varnished test specimen made of combustible propellant material is placed in contact with a hot plate carried to a given temperature.

Tests of compatibility and sensitivity to friction were also conducted. To study compatibility, the thermal stability of the varnishes was determined using the following techniques:

Differential thermal analysis and loss-in-weight test
Stability under vacuum (100° C. for 200 h).

No chemical incompatibility was observed.

As regards sensitivity to friction, no difference was observed between a bare grain and a grain treated with the varnish according to the invention.

EXAMPLE 1

Layer 1: Oleophenolic resin
Layer 2: Polyurethane resin loaded at 10% by mass with potassium perchlorate
Layer 3: Polyurethane resin loaded at 10% by mass with phenolic microballoons
Layer 4: Polyurethane resin.

EXAMPLE 2

Layer 1: Oleophenolic resin
Layer 2: Polyurethane resin loaded ar 10% by mass with KClO$_4$
Layer 3: Polyurethane resin loaded at 5% by mass with phenolic microballoons.
Layer 4: Polyurethane resin loaded at 5% by mass with phenolic microballoons
Layer 5: Polyurethane resin.

EXAMPLE 3

Layer 1: Oleophenolic resin
Layer 2: Polyurethane resin loaded at 10% with lead chromate
Layer 3: Polyurethane resin loaded at 5% with phenolic microballoons
Layer 4: Polyurethane resin loaded at 5% with phenolic microballoons
Layer 5: Polyurethane resin.

The following table shows the main characteristics of these protective varnishes. In the present case, the combustible product test specimen with the following dimensions: 15 mm in height, 42 mm in diameter, consists of well-known tubular simple-base powders agglomerated by means of a binder under low pressure.

The results obtained are equivalent when polyurethane resin is replaced by an alkyd or oleophenolic resin.

The increase in mass of a treated propellant grain is on the order of 3.5 to 4.5 kg.

| Varnish | Thickness (mm) | Resistance to the hot plate Temperature (°C.) | Reaction time (s) | Proportion of non-burnt residues (°/$_{oo}$) |
|---|---|---|---|---|
| Powder alone |  | 300 | 1.00 | 7 |
|  |  | 450 | 0.30 |  |
|  |  | 600 | 0.22 |  |
|  |  | 750 | 0.14 |  |
| Ex. 1 | 0.15–0.20 | 450 | 3.90 | 7 |
|  |  | 600 | 1.50 |  |
| Ex. 2 | 0.17–0.22 | 600 | 2.10 | 7 |
|  |  | 750 | 1.20 |  |
| Ex. 3 | 0.16–0.21 | 600 | 2.00 | 7 |
|  |  | 750 | 1.30 |  |

The multilayer varnishes according to the invention give excellent results as regards the temperature resistance and the proportion of residues. The thermoinitiation times obtained, on the order of 2 s at 600° C. and 1.2 s at 750° C., show a good effectiveness against a short-term thermal effect (time between the ammunition introduction into the weapon chamber and the breech closure) mainly in the case of automatic weapons.

Owing to the combined action of oxidizing agents and the thinness of varnish, the presence of non-burnt residues was not observed either during laboratory tests of inflammation on a hot plate, or during gun firing. As a matter of fact, the 7% proportions of non-burnt residues are equivalent with those obtained on non-treated test specimens.

I claim:

1. A varnish for protecting a caseless or combustible-case round of ammunition against thermoinitiation, said varnish comprising at least one reactive layer applied to said ammunition, said reactive layer consisting of a synthetic resin and an oxidizer, said oxidizer having a decomposition temperature above 350° C.; and at least one insulating layer applied to said reactive layer, said insulating layer consisting of a synthetic resin and a heat-insulating compound.

2. A varnish of claim 1, wherein said synthetic resins are selected from the group consisting of polyurethane, alkyd and oleophenolic resins.

3. A varnish of claim 1, wherein said oxidizer is selected from the group consisting of potassium perchlorate, lead chromate and barium chromate.

4. A varnish of claim 1, wherein said oxidizer comprises 1 to 20% by mass of said reactive layer.

5. A varnish of claim 1 wherein said heat-insulating compound comprises organic or mineral microballoons.

6. A varnish for protecting a caseless or combustible-case round of ammunition against thermoinitiation, said varnish comprising an inner resin layer applied to said ammunition; at least one reactive layer applied to said inner resin layer, said reactive layer consisting of a synthetic resin and an oxidizer, said oxidizer having a decomposition temperature above 350° C.; at least one insulating layer applied to said reactive layer, said insulating layer consisting of a synthetic resin and a heat-insulating compound; and an outer resin layer applied to said insulating layer.

7. A varnish of claim 6, wherein said inner resin layer consists of an oleophenolic resin, said reactive layer consists of a polyurethane resin and potassium perchlorate, said potassium perchlorate comprising 10% by mass of said reactive layer, said insulating layer consists of an polyurethane resin and phenolic microballoons, and said outer resin layer consists of a polyurethane resin.

8. A varnish of claim 7 which comprises two adjacent insulating layers.

9. A varnish of claim 6 having a total thickness of from 0.10 to 0.25 mm.

10. A varnish for protecting a caseless or combustible-case round of ammunition against thermoinitiation, said varnish comprising at least one reactive layer applied to said ammunition, said reactive layer consisting of a polyurethane resin and an oxidizer selected from the group consisting of potassium perchlorate, lead chromate and barium chromate; and at least one insulating layer applied to said reactive layer, said insulating layer consisting of a polyurethane resin and phenolic microballoons.

11. A varnish of claim 10, wherein said oxidizer comprises 1 to 20% by mass of said reactive layer and said phenolic microballoons comprise 1 to 20% by mass of said insulating layer.

12. A varnish for protecting a caseless of combustible-case round of ammunition against thermoinitiation, said varnish comprising an inner resin layer applied to said ammunition, said inner resin layer consisting of an oleophenolic resin; at least one reactive layer applied to said inner resin layer, said reactive layer consisting of a polyurethane resin and an oxidizer selected from the group consisting of potassium perchlorate, lead chromate and barium chromate; at least one insulating layer applied to said reactive layer, said insulating layer consisting of a polyurethane resin and phenolic microballoons; and an outer resin layer applied to said insulating layer, said outer resin layer consisting of a polyurethane resin.

13. A varnish of claim 12 wherein said oxidizer comprises 1 to 20% by mass of said reactive layer and said phenolic microballoons comprise 1 to 20% by mass of said insulating layer.

14. A varnish of claim 12, wherein said varnish has a total thickness of from 0.10 to 0.25 mm.

* * * * *